United States Patent

Ninh et al.

[11] Patent Number: 5,920,186
[45] Date of Patent: Jul. 6, 1999

[54] IN-RUSH CURRENT CONTROL CIRCUITRY

[75] Inventors: Loi Quang Ninh, Foothill Ranch; Bruce Robert Ferguson, Anaheim; Roy Isam Ishida, Costa Mesa, all of Calif.

[73] Assignees: Sony Corporation, Tokyo, Japan; Sony Trans Com, Inc., Terre Haute, Ind.

[21] Appl. No.: 08/856,264

[22] Filed: May 14, 1997

[51] Int. Cl.⁶ .................................................. H02M 7/04
[52] U.S. Cl. ............................ 323/908; 323/901; 363/49
[58] Field of Search .................... 323/901, 908; 363/49, 53; 361/93, 94, 97

[56] References Cited

U.S. PATENT DOCUMENTS

| | | | |
|---|---|---|---|
| 4,328,459 | 5/1982 | McLeod, Jr. | 363/49 |
| 4,504,898 | 3/1985 | Pilukaitis et al. | 363/49 |
| 4,678,984 | 7/1987 | Henze | 323/285 |
| 5,619,127 | 4/1997 | Warizaya | 323/908 |
| 5,715,154 | 2/1998 | Rault | 363/89 |

*Primary Examiner*—Peter S. Wong
*Assistant Examiner*—Derek J. Jardieu
*Attorney, Agent, or Firm*—Jaime A. Siegel; Jerry A. Miller

[57] ABSTRACT

A power supply inrush current control circuit includes a current-limiting resistor connected in series with a first relay, a second relay connected in parallel with the current-limiting resistor and first relay, a power factor correction stage connected in series with the parallel combination of first relay and current-limiting resistor, and second relay, a holdup capacitor connected to an output of the power factor correction stage and a DC/DC converter connected to the output of the power factor correction stage. A first timer is connected to the second relay, a second timer is serially connected to the first timer and to the power factor correction stage, and a third timer is serially connected to the second timer and to the DC/DC converter. Upon energization of the power supply by an AC voltage source, the first relay is activated so as to connect the current-limiting resistor to the AC voltage source, and after a predetermined period of time, the second relay is activated by the first timer so as to short out the current-limiting resistor.

5 Claims, 2 Drawing Sheets

IN-RUSH CURRENT CONTROL CIRCUITRY

BACKGROUND

1. Field of the Invention

This invention relates generally to the field of control circuitry, and, more particularly, this invention relates to in-rush control circuitry which utilizes a fixed resistor and programmable timers to sequentially turn on a first relay, a power factor correction circuit (PFC) and a DC/DC converter.

2. Background of the Invention

When a large power supply is connected to an AC line voltage supply, a short-duration, high amplitude, input current (known as inrush current), results as an internal power supply capacitance is absorbing energy. The inrush current may be many times the steady state current until the power supply reaches equilibrium, i.e., the transient effect continues until the voltage across the internal power supply capacitance reaches a voltage approximately equal to the peak amplitude of the AC line voltage supply.

If a series resistance is used to limit the inrush current, this same resistance will result in power losses during normal operation of the power supply. The duration of the inrush current is extended in In-Flight Entertainment Systems (IFES), because of the large amount of internal capacitance required to hold up the power supply during momentary power interruptions. This long duration, high amplitude inrush current could cause tripping of the AC line circuit breaker or induce line transients that might affect other equipment sharing the common AC power source. A system requirement for IFES necessitates that the inrush current must be limited to less than four times the peak normal operating current which would require a large value of current limiting impedance.

Inrush control circuitry which addresses each of the above set out problems is described below.

SUMMARY OF THE INVENTION

It is an object of the present invention to provide inrush control circuitry which controls an input or inrush current to a large power supply upon connection to an AC line voltage supply.

It is a feature that the present invention provides a circuit which limits the inrush current as needed and is removed from the circuit when normal operation of the power supply has commenced.

It is an advantage that the present invention provides the necessary protection from the high amplitude input current and yet does not cause any power loss or secondary inrush during normal operation.

It is a further advantage of the present invention to implement multiple timers to sequentially turn on a power factor correction circuit and a DC/DC converter so as to maintain the loads in an "off condition" until the inrush current limiting resistor may be switched out of the circuit.

In one embodiment of the invention, a power supply inrush current control circuit includes a current-limiting resistor connected in series with a first relay and a second relay connected in parallel with the current-limiting resistor and the first relay. Upon energization of the power supply by an AC voltage source, the first relay is activated so as to connect the current-limiting resistor to the AC voltage source, and after a predetermined period of time, the second relay is activated so as to short out the current-limiting resistor.

In a second embodiment, a power supply inrush current control circuit further includes a power factor correction stage connected in series with the parallel combination of the first relay, in series with the current-limiting resistor, and the second relay, a holdup capacitor connected to an output of the power factor correction stage and a DC/DC converter connected to the output of the power factor correction stage. A second timer is serially connected to the first timer and a third timer is serially connected to the second timer. In addition, the second timer is further connected to the power factor correction stage, and the third timer is further connected to the DC/DC converter.

After a predetermined period of time, the first timer activates the second timer to turn on the power factor correction stage, and after an additional predetermined period of time, the second timer activates the third timer to turn on the DC/DC converter, thereby maintaining the load in an off condition until the inrush current limiting resistor may be switched out of the circuit.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
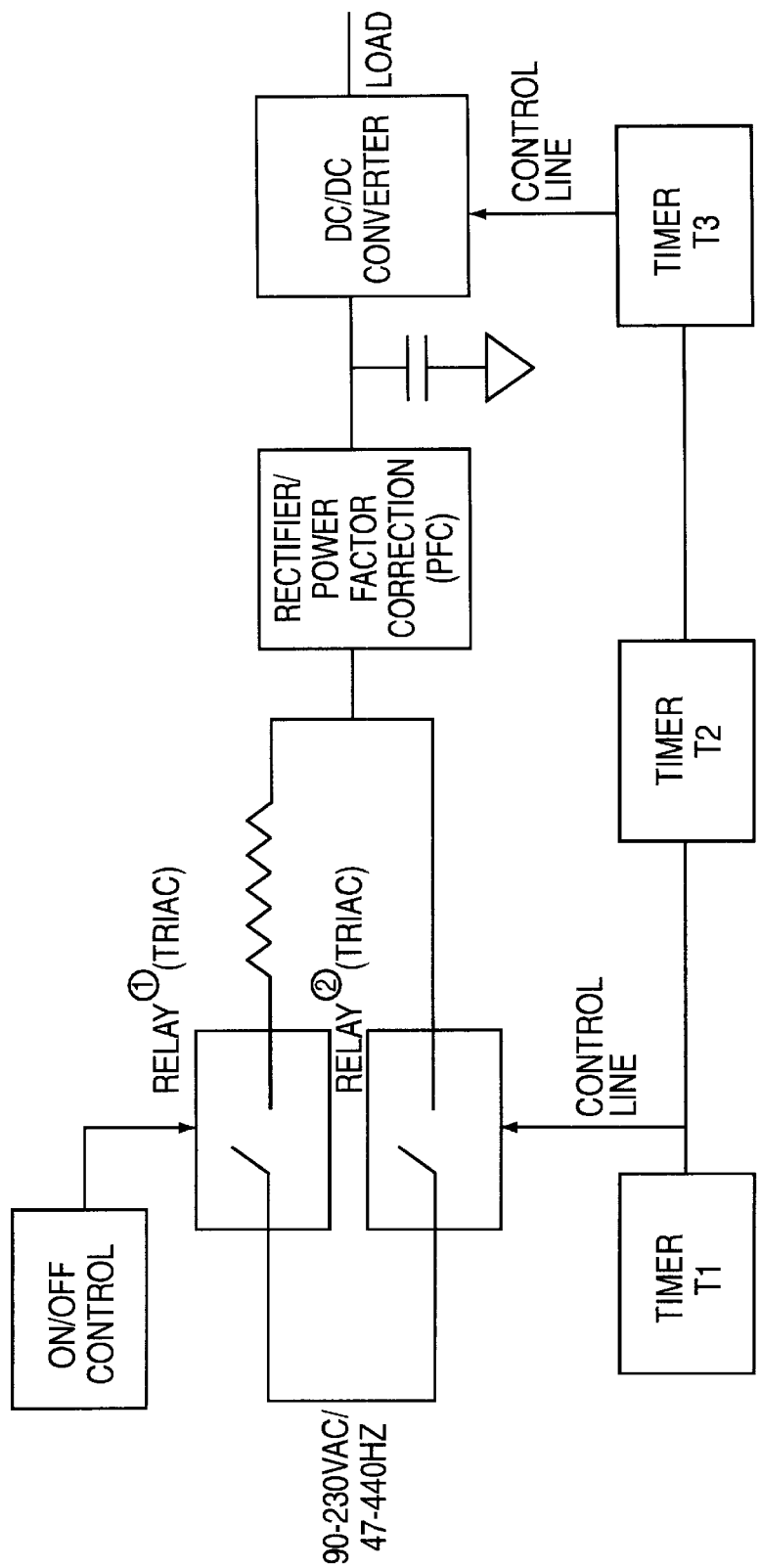
FIG. 1 is a block diagram illustrating a preferred embodiment of an in-rush current control circuit according to the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

To date, the approach to limiting inrush current has been to place a thermistor or a resistor in series with the AC line. However, a thermistor has the disadvantage that if power is cycled off then on, and the thermistor is not allowed to cool down and thus increase in resistance, a large inrush current results.

Alternatively, a switch may be placed across the limiting impedance, but this results in a secondary inrush when the switch is closed due to the finite drop across the limiting impedance due to the currents drawn by the power supply. This secondary inrush can be a large amplitude which might stress the external power distribution system.

Turning now to FIG. 1, to solve the problems described above, fixed resistors and programmable timers are implemented to sequentially turn the a first relay (Triac), a Power Factor correction circuit (PFC) and a DC/DC Converter. The timers are used to keep the loads in an off condition until the inrush current limiting resistor can be switched out of the circuit. The PFC stage contains a soft start circuit to maintain a low level of operating current as the power supply is ramped up to full output power ("power factor" is a figure of merit, indicating whether or not a load in an AC circuit is equivalent to a pure resistance, i.e., indicating whether or not the voltage and current are sinusoidal and in phase).

More specifically, FIG. 1 shows the input AC voltage line connected to a first relay ("Relay 1"), which is connected in parallel with a second relay ("Relay 2"). Relay 1 is connected in series with a fixed resistor ("R1").

Referring still to FIG. 1, when the unit is connected to the AC voltage supply, the first Relay (implemented using a Triac) is activated. Thus, the inrush current is limited by:

In-rush current=AC (voltage)/Fixed resistor

After a short delay (for example, 1 to 2 seconds), a first timer ("T1") will turn on the second Relay, Relay 2, (also implemented using a Triac). The short delay provided by timer T1 (see also FIG. 2, at time $t_1$) assures that the holdup capacitors are fully charged up to the AC voltage amplitude. Since there are no loads within the unit, drawing current from the holdup capacitors or the AC line at this instant, the voltage drop across the current limiting resistance R1 is negligible. The second relay, Relay 2, is connected in parallel with the first relay, Relay 1 and fixed resistor R1, thereby eliminating the voltage drop and power dissipated through fixed resistor R1 during normal operation. The time out of timer one, T1, also activates the next or "second" timer, T2.

Figure 2:
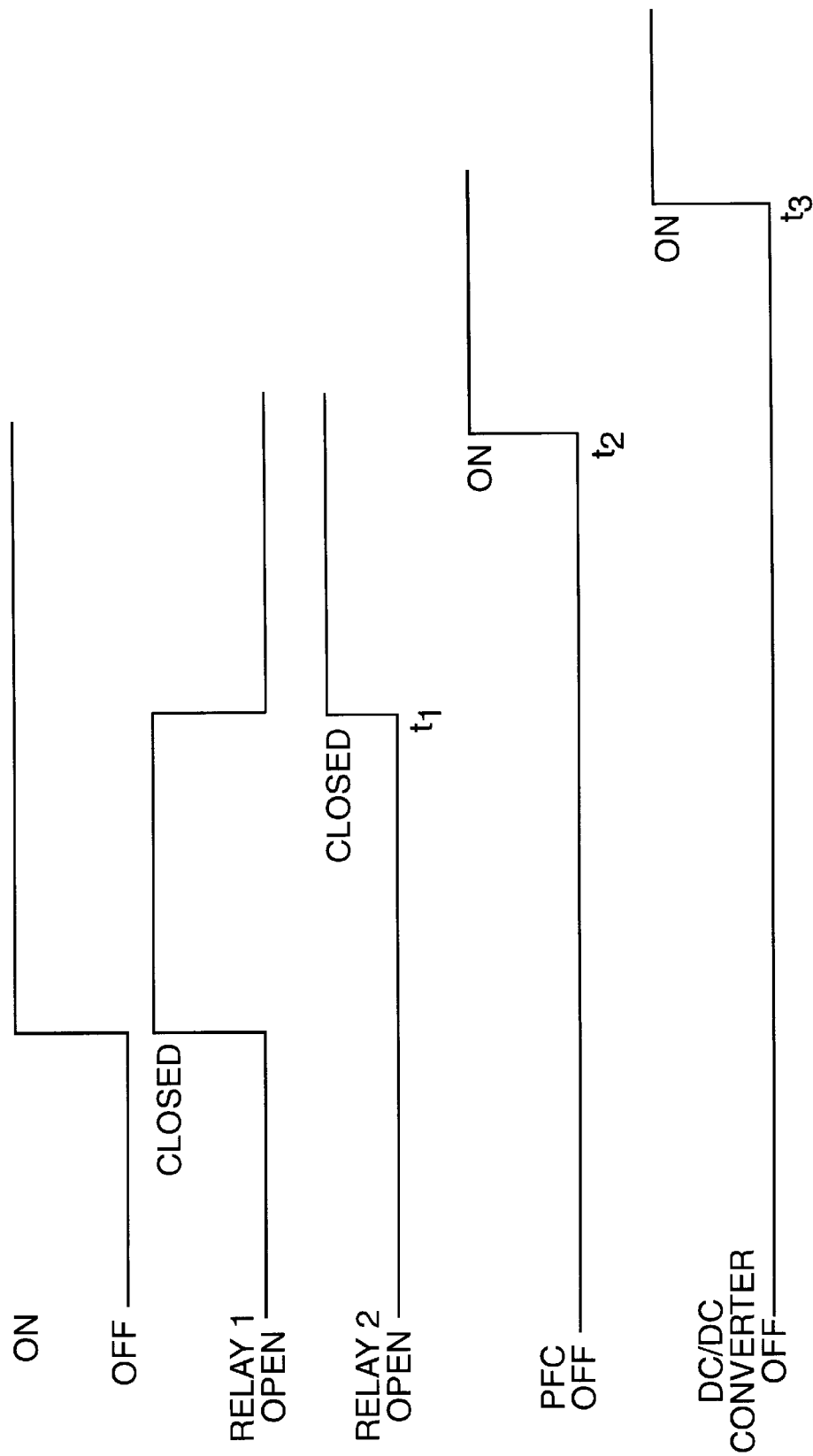
FIG. 2 is a timing diagram illustrating the timing sequence of the on/off control, the first and second relays, the PFC circuit and the DC/DC converter.

After a one second delay (which assures the second relay is closed before applying any loading through the inrush current limiting circuit), the second timer T2 will turn on the Power Factor Correction circuit ("PFC") (see also FIG. 2 at time $t_2$). The second timer T2 also activates the third timer T3.

After a short delay (for example, 1–2 seconds), to allow time for the PFC circuit to boost the hold up capacitor charge to, for example, 325 VDC), the third timer T3 will turn on the DC/DC Converter (see also FIG. 2, at time $t_3$). The DC/DC converter also contains a soft start circuit to maintain a low level of start up current.

By sequentially turning on Relay 1 and fixed resistor R1, Relay 2, the PFC and the DC/DC Converter, the inrush current is controlled and reliably maintained at a low level for any AC voltage or any load.

A rectifier is also preferably incorporated within the PFC. The PFC is an offline boost converter than converts an AC input to a regulated high voltage DC output. Within the PFC module, the input AC voltage (for example 115 Vrms) is rectified and then the rectified (for example 155 V DC) is preferably boosted to a higher (for example 325 V DC) regulated output voltage. A secondary control loop (within the PFC module) regulates the input current waveform to the PFC module so that is resembles the input voltage waveform. Design of an acceptable secondary control loop is believed to be well within the grasp of those skilled in the art. Similarly, known PFCs are usable herein, provided that the PFC chosen has an enable control line. General background in this area is found for example, in available data books from, for example, Motorola, Linear Technology, etc. Because the preferred system has a unity power factor it will be understood that the input current is proportional to the input voltage and that the two waveforms are in phase.

FIG. 2 further illustrates the timing of the activation of each of the on/off switch and timers T1, T2 and T3, so as to activate Relay 1, Relay 2, the PFC circuit, and the DC/DC converter, respectively.

It is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A power supply inrush current control circuit, comprising:

a current-limiting resistor connected in series with a first relay;

a second relay connected in parallel with said current-limiting resistor and said first relay;

a power factor correction stage connected in series with the parallel combination of said first relay in series with said current-limiting resistor, and said second relay;

a rectifier, wherein said first and second relays are on the line side of said rectifier;

at least one holdup capacitor connected to an output of said power factor correction stage;

a DC/DC converter connected to the output of said power factor correction stage;

a first timer connected to said second relay;

a second timer serially connected to said first timer and to said power factor correction stage; and a third timer serially connected to said second timer and to said DC/DC converter;

wherein upon energization of the power supply by an AC voltage source, said first relay is activated so as to connect said current-limiting resistor to the AC voltage source;

further wherein after a first predetermined period of time, said second relay is activated by said first timer so as to short out said current-limiting resistor;

further wherein said first timer activates said second timer which after a second predetermined period of time then turns on said power factor correction stage; and further wherein said second timer activates said third timer which after a third predetermined period of time then turns on said DC/DC converter.

2. A power supply inrush current control circuit according to claim 1, wherein said power factor correction stage contains a soft start circuit such that a low level of operating current is maintained as the power supply is ramped up to full output power.

3. A power supply inrush current control circuit according to claim 1, wherein said DC/DC converter contains a soft start circuit such that a low level of operating current is maintained as the power supply is ramped up to full output power.

4. A power supply inrush current control circuit according to claim 1, wherein the third predetermined period of time corresponds to the amount of time necessary for the power factor correction stage to raise the charge of said holdup capacitor to a predetermined level.

5. A power supply inrush current control circuit according to claim 1, wherein an output of said DC/DC converter is connected to a load.

* * * * *